United States Patent Office 3,065,109
Patented Nov. 20, 1962

3,065,109
PRIMER FOR POLYESTER REINFORCED PLASTIC
William L. Hensley, Stamford, Conn., assignor to American Cyanamid Company, New York, N.Y., a corporation of Maine
No Drawing. Filed June 3, 1960, Ser. No. 33,646
15 Claims. (Cl. 117—138.8)

This invention relates to a process for coating an article of manufacture molded from a reinforced polyester resin composition and to the product thus produced. More particularly this invention relates to a process for coating an article of manufacture molded from a reinforced polyester resin composition comprising applying to said molded article a film of a composition of matter comprising a mixture of (A) from about 10% to about 50% by weight of a water dispersible polymethyl ether of polymethylol melamine and (B) correspondingly from about 90% to about 50% by weight of an ammoniated salt of a material selected from the group consisting of (1) a dimer of an unsaturated fatty acid having from 14 to 24 carbon atoms and (2) an addition reaction product of a polymerizable styrene and an unsaturated fatty acid having from 14 to 24 carbon atoms and baking the film.

One of the objects of the present invention is to produce an article of manufacture molded from a reinforced polyester resin composition having a baked film on the surface thereof of a mixture of (A) from about 10% to about 50% by weight of a water dispersible polymethyl ether of polymethylol melamine and (B) correspondingly from about 90% to 50% by weight of an ammoniated salt of a material selected from the group consisting of (1) a dimer of an unsaturated fatty acid having from 14 to 24 carbon atoms and (2) an addition reaction product of a polymerizable styrene and an unsaturated fatty acid having from 14 to 24 carbon atoms. A further object of the present invention is to produce an article of manufacture comprising a reinforced polyester resin molded material having a film baked thereon which adheres tenaciously to the substrate. These and other objects of the present invention will be discussed in greater detail hereinbelow.

A simplified flow diagram of the method is as follows:

```
              A reinforced polyester resin molded article.
              /                                          \
Coating with a mixture of              Coating with a mixture of
(A) polymethyl ether of poly-          (A) polymethyl ether of poly-
methylol melamine and (B)              methylol melamine and (B)
an ammoniated salt of an ad-           an ammoniated salt of a
dition reaction product of a           dimer of certain unsaturated
styrene and certain unsatu-            fatty acids to form a film.
rated fatty acids to form a
film.
              \                                          /
                          Baking the film.
```

The polyester resin compositions which are converted to molded articles used in the process of the present invention are conventionally known in the art. These polyester resin compositions are prepared by reacting a polyhydric alcohol with an alpha, beta-ethylenically unsaturated polycarboxylic acid. These polyester resin compositions frequently contain in addition to the alpha, beta-ethylenically unsaturated polycarboxylic acid a polycarboxylic acid which is free of non benzenoid unsaturation. These polyester resins are then blended with a polymerizably reactive monomeric material which functions as a crosslinking agent and the total composition is reinforced by the addition of a fibrous filler and the total composition is then converted to a thermoset state by catalysis or by the application of heat and/or pressure. These polyester resin compositions are well known in the art and had been described at length in a plurality of U.S. patents including the U.S. Patents 2,255,313; 2,443,735–741 inclusive, 2,632,751 among others. All of the disclosures of these cited patents are incorporated herein by reference.

These polyester resin molding compositions are prepared by blending the polyester resin composition with a reinforcing material generally fibrous in nature. These fibrous materials may be glass fibers, sisal fibers, cotton fibers, synthetic resinous fibers such as polyester resin fibers, polyacrylonitrile fibers, super polyamide fibers and the like, chopped rovings, chopped glass fabrics either woven or unwoven and the like. These polyester resin molding compositions may be colored with suitable pigments and/or dyes.

These molded articles prepared from these polyester resin compositions may be designed for use in a plurality of applications. One of the principal end uses for these molded articles will be as articles of luggage although mayn other uses for these molded articles will be readily applicable. Other end uses for these molded articles include boats, switch boxes, automotive accessories, advertising novelties, blowers and housings therefor, control mechanisms, displays, housings for electronic devices, tool handles, machine tool parts, office equipment, photographic equipment, corrugated sheeting, among many others.

The articles molded from the unsaturated polyester resins, which are treated in accordance with the process of the present invention, have a surface characteristic such that it is with extreme difficulty that one is able to coat the surface thereof with a suitable coating composition which is designed to adhere tenaciously to the polyester resin substrate. A substantial plurality of different coating compositions have been tested in this connection only to find that in almost every instance one or more shortcomings have been found in the coating compositions which otherwise have utility for coating other substrates. Among the outstanding shortcomings of these coating compositions which have been applied to a polyester resin substrate is the shortcoming of pealing or flaking from the substrate. This is clearly and obviously an undesirable attribute of a coating composition. The coating composition used in keeping with the process of the present invention surprisingly is able to bond itself so securely to the polyester resin substrate that no appreciable pealing or flaking is to be observed. The coating composition used in the practice of the present invention is described fully in the U.S. application having the Serial No. 832,473 filed on August 10, 1959, in the name of Ralph Earl Layman, Jr., now U.S. Patent No. 3,025,251, which application has the title "Resinous Coating Composition." The coating compositions used in the present invention contain two principal components as the film forming ingredients and these two components are present in the film forming coating composition in admixture with one another. One of the ingredients contained in the coating composition of the present invention is a polymethyl ether of polymethylol melamine and preferably the hexamethyl ether of hexamethylol melamine. As used, these materials are not resinous but are potential resin forming materials. These polymethyl ethers of polymethylol melamines will be discussed in greater detail immediately hereinbelow.

THE POLYMETHYL ETHERS OF POLYMETHYLOL MELAMINES

The polymethyl ethers of polymethylol melamines are well known in the art as are methods for preparing the same. Reference is made to the U.S. Patent 2,197,357 which discloses a process for making polyalkyl ethers of polyalkylol triazines. In order to prepare a polymethylol melamine, one would react 1 mol of melamine with at least 2 mols of formaldehyde. When one wishes to produce a fully methylolated melamine such as hexamethylol melamine, one should react at least 6 mols of formaldehyde with 1 mol of melamine. It is known in the art that in the preparation of monomers such as dimethylol melamine, trimethylol melamine, tetramethylol melamine, pentamethylol melamine and hexamethylol melamine that care must be exercised in order to produce the monomer without entering into any appreciable condensation which would result in resin formation even though only to a slightly advanced degree. These processes for the producing of monomeric materials are defined generically and specifically in the prior art and as a rule the degree of methylolation is directly related to the amount of the formaldehyde charged to the reaction sphere. As soon as methylolation has been accomplished, the reaction is stopped so as to prevent any advancement of resinification. The polymethylol melamines thus produced are then reacted with methanol in a quantity sufficient to produce the desired methyl ether. Again in this instance, exercise of care is necessary to prevent premature resinification. If a dimethylol melamine compound is reacted with 2 mols of methanol, there will result the dimethyl ether of dimethylol melamine. With the higher methylol melamines such as the trimethylol melamine, hexamethylol melamine, and the like, one may react from 2 mols of methanol to at least 6 mols of methanol depending on the number of methylol groups available for an esterification and depending on whether or not full methyl ethers are desired or whether only a partial methylation is required. One could produce for instance the dimethyl ether of tetramethylol melamine or the tetramethyl ether of tetramethylol melamine. By way of further illustration, one could produce the trimethyl ether of hexamethylol melamine or the pentamethyl ether of hexamethylol melamine or upon full etherification, one could produce the hexamethyl ether of hexamethylol melamine. For the purposes of the present invention, the hexamethyl ether of hexamethylol melamine is the preferred potential resin forming material utilized. The amount of the polymethyl ether of polymethylol melamine which may be used in the compositions of the present invention may be varied between about 10% and about 50% by weight based on the total weight of said melamine compound and said ammoniated salt. The balance of the composition will correspondingly be about 90% to about 50% by weight of the ammoniated derivative. When the composition of the present invention are to be used as a primer coating, the amount of the polymethyl ether of polymethylol melamine to be used is preferably between about 15% and 20% by weight based on the total weight of the composition. When the compositions of the present invention are to be used as a finished coating such as an enamel, the amount of the melamine material may be varied between about 30% and 35% by weight, same basis.

The second principal component contained in the coating compositions used in the present invention are ammoniated derivatives of a material selected from the group consisting of (1) a dimer of an unsaturated fatty acid having from 14 to 24 carbon atoms and (2) an addition reaction product of a polymerizable styrene and an unsaturated fatty acid having from 14 to 24 carbon atoms. Among the fatty acids which may be used in the coating composition used in the present invention are myristoleic, palmitoleic, oleic, linoleic, linolenic, elaeostearic, licanic, ricinoleic, erucic, cetoleic, petroselic, nervonic, clupanodonic stearolic, behenolic, brassidic and the like. These acids may be used either singly or in combination with one another. It is actually preferred to use these acids in admixture with one another particularly when these acids are derived from a glyceride oil. Practically all glyceride oils are composed of the glycerol triesters of mixed fatty acids including saturated fatty acids as well as unsaturated fatty acids. The fatty acids derived from such glyceride oils even though in admixture with saturated fatty acids will be very useful in the practice in the process of the present invention. Inasmuch as a preponderance of unsaturated fatty acids are desired, it is preferred that if fatty acid fractions of glyceride oils are to be used that they be selected from semi-drying glyceride oils and the drying glyceride oils. Illustrative of these glyceride oils from which one may derive the fatty acids used in the present invention are dehydrated castor oil, linseed oil, soya oil, and the fatty acid fraction of tall oil. These unsaturated fatty acids may be dimerized by conventional procedures or they may be reacted with a polymerizable styrene to form an addition reaction product, either of which are useful in the compositions in the present invention. In the dimerization of the fatty acids, conventional procedures are utilized. These dimer acids may be prepared according to the procedure outlined in "Paint and Varnish Production," August 1951, page 20 and ff. When it is desired to utilize the addition reaction product or the polymerizable styrene and an unsaturated fatty acid having from 14 to 24 carbon atoms, any of the fatty acids set forth hereinabove may be utilized. Among the polymerizable styrenes which may be used to form this addition reaction product are styrene per se, ring-substituted alkyl styrenes such as o-methyl styrene, m-methyl styrene, p-methyl styrene, 2,4-dimethyl styrene, 2,5-dimethyl styrene, 3,4-dimethyl styrene, or the ring-substituted halo styrene such as o-chloro styrene, m-chloro styrene, p-chloro, 2,4-dichloro styrene, and the like. Additionally, one may make use of side chain substituted styrenes such as α-methyl styrene, α-chlorostyrene, and the like. Obviously, these polymerizable styrenes may be used either singly or in combination with each other. The amount of styrene used to react with the unsaturated fatty acid may be varied over a fairly wide range such as 0.5 mol of styrene compound per mol of fatty acid up to 2 mols of styrene compounds per mol of fatty acid. It is preferred that the ratio of the polymerizable styrene to the fatty acid be approximately equimolar, namely, 1 mol of styrene per mol of unsaturated fatty acid. The ultimate product produced by this addition reaction is analogous to the dimer of the fatty acid inasmuch as only one molecule of styrene attaches itself to the fatty acid at a given unsaturated linkage. When only one such linkage si available, the molecule of styrene adds on and further build-up of the chain is precluded by virtue of the fact that an insufficient quantity of styrene is present to permit such build-up. Where two or more sites are available on the fatty acid chain, one molecule of styrene can attach itself to each of the available sites or to a plurality of said sites, short of all of them. If desired, one can make use of small quantities of divinyl benzene in addition to the polymerizable styrene but not in complete substitution therefore. When it is desired to utilize divinyl benzene, one may utilize between 10% and 12% by weight based on the total weight of the vinyl compounds present. The mechanism for producing the addition reaction product of the polymerizable styrene and the unsaturated fatty acid is best accomplished by introducing the selected amount of the fatty acid into a suitable reaction vessel and heating the fatty acid to a temperature between about 120° C. and the reflux temperature of the polymerizable monomer to be used, namely, about 160° C. on the average, depending upon the particular fatty acid and while holding the fatty acid at said temperature and with constant stirring, one introduces the polymerizable styrene blended with catalytic quantities of a conventional peroxide catalyst such as ditertiary butyl peroxide into the hot fatty acid in comparatively small increments so as to achieve substantially complete addition reaction without accomplishing any significant homopolymerization of the styrene and without accomplishing any significant dimerization of the fatty acid. It is less material if one experiences dimerization of the fatty acid than if one experiences homopolymerization of the styrene inasmuch as mixtures of the dimer of the fatty acid and the addition reaction product of the polymerization styrene and the unsaturated fatty acid may be utilized. The homopolymer styrene, however, may tend to have an adverse effect on the ultimate composition, and formation, in any significant amount, of such homopolymer should therefore be avoided. After the addition of the styrene catalyst mix has been completed, the charge is held at the temperature between about 120° C. and 160° C. and preferably between about 150° C. and 155° C. for a period of about 10 minutes to about 4 hours. For more complete control of the addition reaction, periods of 15 minutes to 1 hour are preferred. The ammoniation of the dimer of the addition reaction products can be accomplished by adding a sufficient amount of ammonium hydroxide to said dimer or said reaction product calculated on a stoichiometrical basis to substantially completely ammoniate the carboxyl groups present in said dimer or said reaction product. Conventionally, one would utilize a 28% solution of ammonia in water which may be diluted with enough of water to reduce the concentration to about a 6% solution. This ammoniation step can be accomplished either before the dimer or addition reaction product is added to the polymethyl ether of polymethylol melamine or the melamine compound may be added to the dimer or addition reaction product as produced and after thorough blending of the two components, the ammonia solution may be added and then post-ammoniation can be accomplished. It has been mentioned hereinabove that a peroxide catalyst is utilized in accomplishing the styrene-fatty acid reaction product. These peroxide catalysts are all well known in the art and a substantial plurality of them are available commercially such as benzoyl peroxide, tertiary butyl hydroperoxide, cumene hydroperoxide, and the like. As is customary, conventional catalytic quantities of these catalysts are used in the preparation of these reaction products.

In order that the coating compositions used in the present invention may be more completely understood, the following examples are set forth which all parts are parts by weight unless otherwise indicated. These examples are set forth primarily for the purpose of illustration and any specific enumeration of detail contained therein should not be interpreted as a limitation on the case except as is indicated in the appended claims.

*Coating Composition No. 1*

20 parts of the hexamethyl ether of hexamethylol melamine and 80 parts of the addition reaction product of dehydrated castor oil fatty acids and o-methyl styrene in a mol ratio of 1.1 are blended together in 220 parts of water to which a sufficient amount of ammonia has been added so as to completely ammoniate the methyl styrene-dehydrated castor oil fatty acids reaction product. The acid value of the mixture (prior to ammoniation) was 108; the color 5, Gardner 1933; and the viscosity F, Gardner Holt. The solids content was approximately 45.5%. To this solution there is added 1% of para-toluene sulfonic acid based on the total weight of the melamine reaction product. Pigments of various kinds could be incorporated into the coating composition in varying amounts according to choice. The blend is then ground for a 24-hour period in a steel ball mill.

*Coating Composition No. 2*

Coating composition No. 1 was reproduced in every detail except that the dehydrated castor oil fatty acid-methylstyrene reaction product was post-bodied to a viscosity of X+ by the addition of further quantities of ditertiary butyl peroxide after the addition of the peroxide monomeric mixture had been completed.

*Coating Composition No. 3*

Into a suitable mixing vessel, there is introduced 220 parts of water, 20 parts of hexamethyl ether of hexamethylol melamine, 80 parts of the reaction product of 72 parts of dehydrated castor oil fatty acids, 28 parts of the dimer acids of dehydrated castor oil fatty acids and styrene reacted in a sufficient quantity to provide a mol/mol ratio. The charge is blended together and a sufficient quantity of ammonium hydroxide is added, calculated on stoichiometrical basis, to ammoniate substantially all the carboxyl groups in the acid compound of the resinous material.

*Coating Composition No. 4*

Into a suitable mixing vessel as before, there is introduced 255 parts of water, 20 parts of hexamethyl ether of hexamethylol melamine and 80 parts of the ammoniated reaction product of dehydrated castor oil fatty acids and vinyl toluene in a mol ratio of 1:1 with the additional modification that of the total amount of vinyl toluene present, there was added additionally 10% of divinyl benzene. The vinyl toluene fatty acid reaction product had been post-bodied as in coating composition No. 2.

*Coating Composition No. 5*

Into a suitable mixing vessel as before there is introduced 222 parts of water, 20 parts of hexamethyl ether of hexamethylol melamine, 80 parts of tall oil fatty acids (doubly distilled) coreacted with vinyl toluene on a mol ratio of 1:1 containing 10% of divinyl benzene based on the total weight of vinyl toluene. After the components had been mixed thoroughly, a sufficient amount of ammonium hydroxide, calculated on a stoichiometrical basis, was added and it substantially completely ammoniated the tall oil fatty acid fraction moiety in the vinyl toluene reaction product.

EXAMPLE I

An article molded from a glass fiber filled unsaturated polyester resin composition molded in the shape of a section of a piece of luggage is coated with the composition of No. 1 and is permitted to air dry and then is baked for 30 minutes at 350° F. The coated object displays a baked film which is bonded tenaciously to the polyester resin molded article substrate. Scratching with a knife in a conventional knife test fails to dislodge any significant amount of the film.

EXAMPLE II

A switch box molded from a glass fiber filled polyester resin composition is coated with the coating composition No. 3 and the switch box is then baked at 375° F. for about 20 minutes. The coated switch box displays a baked film which is bonded tenaciously to the substrate and which displays excellent resistance to gasoline softening, and very good acetic acid resistance.

The coating compositions used in the present invention may be applied in any of the conventional procedures. One may apply these coating compositions by spraying, brushing, dipping, roller coating and the like. If a thick coating is desired even knife coating may be utilized as the mode of application. The coating compositions used in the present invention may be used as a simple mixture of two principal components but preferably and ordinarily these coating compositions will be used as an aqueous dispersion thereof. The solids of the film forming materials in these coating compositions dispersed in an aqueous medium will vary depending upon the particular mode of application selected. If one elects to use a spray technique for applying the film to the substrate one should dilute the coating composition with a sufficient amount of water so as to have a viscosity varying between about 15 and 100 seconds in a #4 Ford cup. For spraying operations a viscosity of 40 seconds in a #4 Ford cup is preferred. For brushing purposes the composition should be diluted sufficiently to give a viscosity of between about 70 and 90 Krebs units.

In applying the coating composition used in the present invention to the molded polyester resin substrate, one may if one chooses, permit the film to air dry and then proceed to bake. It is not imperative that the film be air dried before baking although for certain purposes this may be desirable. In the baking step one may use a comparatively wide range of temperatures such as any temperature above the boiling point of water which is the carrier medium for the coating compositions used in the present invention. When temperatures just slightly above 212° F. are used, the amount of time required to achieve the bake is too prolonged as a rule, and as a consequence, it is generally desired to bake the film at a temperature between about 300° F. and 400° F. The amount of time required to achieve the bake varies inversely with the temperature used. At 300° F. generally about 1 hour is required whereas at 400° F. only about 15 minutes is required. It is preferred to bake these films at a temperature of about 350° F. for a period of about 30 minutes.

If it is desired to add a finishing coat to the coated polyester resin molded article one may choose to sand the initial coating prior to the application of the finishing coat. Among the finishing coats which may be applied to the film on the substrate are the alkyd-amino baking enamels, nitrocellulose lacquers, acrylic coatings, oleoresinous varnishes, and the like. One could use certain water soluble top coating materials such as those disclosed and claimed in the U.S. Patent 2,906,724 or 2,889,293. Additionally, one could use as the top coating material the epoxy resinous coating compositions whether they be amine cured, amino resin cured resin or phenolic cured.

The knife blade test applied in the Examples I and II hereinabove were performed in accordance with the Government Specification No. 617.1 of the Federal Specification TT–P–141b, January 1949.

The coating compositions used in the present invention can obviously be used solely as a protective coating without benefit of any pigmentation or other coloring material but ordinarily it is desired to apply a different colored effect to the substrate than that which naturally occurs and as a consequence in many instances it will be desired to color the coating composition used to produce the baked film by adding to said coating composition selected quantities and types of dyes and/or pigments. All of these techniques of adding coloring materials to coating compositions are well known in the art and further delineation thereof here is deemed to be unnecessary.

In practicing the process of the present invention it may be desired in certain instances to prebake the molded article at a temperature such as those outlined hereinabove for approximately the same corresponding periods of time prior to the application of the coating composition used in the present invention.

Although the concept of the present invention is directed primarily to molded articles which have contoured shapes the concept of the present invention is also directed to molded or laminated articles which are uniplanular.

I claim:

1. A process for coating an article molded from a reinforced polyester resin composition comprising applying a film of a composition of matter comprising a mixture of (A) from about 10% to about 50% by weight of a water dispersible polymethyl ether of polymethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms, and baking the film.

2. A process for coating an article molded from a reinforced polyester resin composition comprising applying a film of a composition of matter comprising a mixture of (A) from about 10% to about 50% by weight of a water dispersible hexamethyl ether of hexamethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms, and baking the film.

3. A process for coating an article molded from a reinforced polyester resin composition comprising applying a film of a composition of matter comprising a mixture, in aqueous dispersion, of (A) from about 10% to about 50% by weight of hexamethyl ether of hexamethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms, and baking the film.

4. A process for coating an article molded from a reinforced polyester resin composition comprising applying a film of a composition of matter comprising a mixture, in aqueous dispersion, of (A) from about 10% to about 50% by weight of a water dispersible polymethylether of polymethylol melamine and (B) correspondingly from about 90 % to about 50% by weight of an ammoniated salt of a dimer of an unsaturated fatty acid having from 14 to 24 carbon atoms and baking the film.

5. A process for coating an article molded from a reinforced polyester resin composition comprising applying a film of a composition of matter comprising a mixture, in aqueous dispersion, of (A) from about 10% to about 50% by weight of a water dispersible polymethyl ether of polymethylol melamine and (B) correspondingly from about 90% to about 50% by weight of an ammoniated salt of an addition reaction product of a polymerizable styrene and an unsaturated fatty acid having from 14 to 24 carbon atoms and baking the film.

6. A process for coating an article molded from a reinforced polyester resin composition comprising applying a film of a composition of matter comprising a mixture, in aqueous dispersion, of (A) from about 10% to about 50% by weight of hexamethyl ether of hexamethylol melamine and (B) correspondingly from about 90% to about 50% by weight of an ammoniated salt of a dimer of an unsaturated fatty acid having from 14 to 24 carbon atoms and baking the film.

7. A process for coating an article molded from a reinforced polyester resin composition comprising applying a film of a composition of matter comprising a mixture, in aqueous dispersion, of (A) from about 10% to about 50% by weight of hexamethyl ether of hexamethylol melamine and (B) correspondingly from about 90% to about 50% by weight of an ammoniated salt of an addition reaction product of a polymerizable styrene and an unsaturated fatty acid having from 14 to 24 carbon atoms and baking the film.

8. A process for coating an article molded from a reinforced polyester resin composition comprising applying a composition of matter comprising a mixture, in aqueous dispersion, of (A) from about 10% to about 50% by weight of hexamethyl ether of hexamethylol melamine and (B) correspondingly from about 90% to about 50% by weight of an ammoniated salt of an addition reaction product of the fatty acids of dehydrated castor oil and methylstyrene and baking the film.

9. A process for coating an article molded from a reinforced polyester resin composition comprising applying a composition of matter comprising a mixture, in aqueous dispersion, of (A) from about 10% to about 50% by weight of hexamethyl ether of hexamethylol melamine and (B) correspondingly from about 90% to about 50% by weight of an ammoniated salt of an addition reaction product of the fatty acids of dehydrated castor oil and styrene and baking the film.

10. A process for coating an article molded from a reinforced polyester resin composition comprising applying a film of a composition of matter comprising a mixture, in aqueous dispersion, of (A) from about 10% to about 50% by weight of hexamethyl ether of hexamethylol melamine and (B) correspondingly from about 90% to about 50% by weight of an ammoniated salt of a dimer of linoleic acid and baking the film.

11. An article molded from a reinforced polyester resin composition having a baked film on the surface thereof of a mixture of (A) from about 10% to about 50% by weight of a water dispersible polymethyl ether of polymethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms.

12. An article molded from a reinforced polyester resin composition having a baked film on the surface thereof of a mixture of (A) from about 10% to about 50% by weight of hexamethyl ether of hexamethylol melamine and (B) correspondingly from about 90% to 50% by weight of an ammoniated salt of a material selected from the group consisting of (1) a dimer of unsaturated fatty acid having from 14 to 24 carbon atoms and (2) an addition reaction product of a polymerizable styrene and an unsaturated fatty acid having from 14 to 24 carbon atoms.

13. An article molded from a reinforced polyester resin composition having a baked film on the surface thereof of a mixture of (A) from about 10% to about 50% by weight of hexamethyl ether of hexamethylol melamine and (B) correspondingly from about 90% to 50% by weight of an ammoniated salt of an addition reaction product of the fatty acids of dehydrated castor oil and methylstyrene.

14. An article molded from a reinforced polyester resin composition having a baked film on the surface thereof of a mixture of (A) from about 10% to about 50% by weight of hexyamethyl ether of hexamethylol melamine and (B) correspondingly from about 90% to 50% by weight of an ammoniated salt of an addition reaction product of the fatty acids of dehydrated castor oil and styrene.

15. An article molded from a reinforced polyester resin composition having a baked film on the surface thereof of a mixture of (A) from about 10% to about 50% by weight of hexamethyl ether of hexamethylol melamine and (B) correspondingly from about 90% to about 50% by weight of an ammoniated salt of a dimer of linoleic acid.

References Cited in the file of this patent

UNITED STATES PATENTS

| | | |
|---|---|---|
| 2,796,362 | Wooding et al. | June 18, 1957 |
| 2,860,801 | Nielsen | Nov. 18, 1958 |
| 2,915,486 | Shelly | Dec. 1, 1959 |
| 2,955,958 | Brown | Oct. 11, 1960 |
| 2,971,930 | Glude | Feb. 14, 1961 |
| 2,976,167 | Maeder | Mar. 21, 1961 |